United States Patent
Eguchi et al.

(10) Patent No.: US 7,268,921 B2
(45) Date of Patent: Sep. 11, 2007

(54) INTERNET FACSIMILE APPARATUS AND THE APPARATUS SETTING METHOD

(75) Inventors: Masashi Eguchi, Joyo (JP); Hisanori Tomita, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 991 days.

(21) Appl. No.: 10/298,443

(22) Filed: Nov. 18, 2002

(65) Prior Publication Data

US 2003/0112472 A1    Jun. 19, 2003

(30) Foreign Application Priority Data

Dec. 14, 2001  (JP)  .............. 2001-381953
Dec. 14, 2001  (JP)  .............. 2001-381954
Dec. 19, 2001  (JP)  .............. 2001-386256

(51) Int. Cl.
    G06F 15/00   (2006.01)
    G06F 3/12    (2006.01)
(52) U.S. Cl. ............................. 358/402; 358/1.15
(58) Field of Classification Search .......... 358/1.1, 358/1.9, 1.13, 1.15, 402, 448
    See application file for complete search history.

(56) References Cited

U.S. PATENT DOCUMENTS 6,348,970 B1 *  2/2002  Marx ................. 358/1.15
6,744,736 B1 *  6/2004  Ito .................... 370/245

FOREIGN PATENT DOCUMENTS

| JP | 05-236237 | 9/1993 |
| JP | 08-274931 | 10/1996 |
| JP | 11-032198 | 2/1999 |
| JP | 11-187062 | 7/1999 |
| JP | 2000-010884 | 1/2000 |
| JP | 2000-244493 | 9/2000 |
| JP | 2001-094692 | 4/2001 |
| JP | 2001-217948 | 8/2001 |
| JP | 2001-292266 | 10/2001 |

* cited by examiner

Primary Examiner—Gabriel I. Garcia
(74) Attorney, Agent, or Firm—Hogan & Hartson LLP

(57) ABSTRACT

An Internet facsimile apparatus includes an interface accepting remote commands sent by e-mail, a processor permitting or rejecting the remote commands based on a domain name or an e-mail address associated with the remote commands, and a processor executing the remote commands.

11 Claims, 12 Drawing Sheets

FIG. 3

| AUTHORIZED DOMAIN NAME Table ||
|---|---|
| NO. | DOMAIN NAME |
| 1 | rh.et.ma.co.jp |
| 2 | po.net.or.jp |
| | ⋮ |

FIG. 4

| AUTHORIZED MAIL ADDRESS Table ||
|---|---|
| NO. | MAIL ADDRESS |
| 1 | mail145@rh.et.ma.co.jp |
| 2 | shi@mb.web.ne.jp |
| | ⋮ |

FIG. 5

| MAIL ADDRESS AUTHORIZED TO UPDATE Table |||
|---|---|---|
| NO. | MAIL ADDRESS | PASSWORD |
| 1 | mail145@rh.et.ma.co.jp | 1234% |
| 2 | shi@mb.web.ne.jp | 9999% |
| | ⋮ | |

FIG. 6

| ITEMIZED AUTHORIZATION Table |||
|---|---|---|
| receive-internal-time | | authorized to update or refer to |
| NO. | DOMAIN NAME | PASSWORD |
| 1 | po.net.or.jp | 9876% |
| 2 | mb.web.ne.jp | 9999% |
| file-format | | authorized to refer to |
| 3 | po.net.or.jp | |
| 4 | mb.web.ne.jp | |
| file-format | | authorized to update or refer to |
| 5 | rh.et.ma.co.jp | 1234% |
| | ⋮ | |

FIG.8

```
From: "mail45" <mail45@rh.et.ma.co.jp>
To: "ha01" <ha01@rh.et.ma.co.jp>
Subject: %get-email-settings#1234%
Date: Tue, 13 Nov 2001 23:47:40 +0900
MIME-Version: 1.0
Content-Type: text/plain;
    charset="iso-2022-jp"
Content-Transfer-Encoding: 7bit
```

FIG.9

```
Return-Path: <ha01@rh.et.ma.co.jp>
Received: from ha01 ([192.168.1.66])
    by radh.rh.et.ma.co.jp (8.9.3/8.8.7) with SMTP id AAA18322
    for <mail45@rh.et.ma.co.jp>; Wed. 14 Nov 2001 00:00:17 GMT
Message-Id: <200111140000.AAA18322@radh.rh.et.ma.co.jp>
From: "ha01(abcd01)" <ha01@rh.et.ma.co.jp>
Date: Tue, 13 Nov 2001 23:51:21 +0900
To: mail45@rh.et.ma.co.jp
Subject: Re: %get-email-settings#1234%
In-Reply-To:
References:
MIME-Version: 1.0
Content-Type: text/plain: charset="us-ascii"
Content-Transfer-Encoding: 7bit
X-UIDL: X$M!!T#P!!-RX"!*IX"!

Followings are the current e-mail environment settings.

%receive-interval-time=2;(0 hour 0 minuites 2 second)
%accept-request-to-reply=yes
%relay-to-fax-and-print=no
%relay-to-fax-accept-domain=
%file-format=PDF
%insert-text=yes
%insert-text-language=eng
%receipt-notification=mdn
%ignore-mdn-request=no
%request-mdn-accept-domain=
%reply-mdn-copy-message=no
%ins-blist-addr-to-header=yes
```

FIG.10

```
e-mail-setting

%receive-interval-time=5;(0 hour 0 minuites 5 second)
%accept-request-to-relay=yes
%relay-to-fax-and-print=no
%relay-to-fax-accept-domain=
%file-format=JPEG
%insert-text=yes
%insert-text-language=eng
%receipt-notification=
%ignore-mdn-request=no
%request-mdn-accept-domain=
%reply-mdn-copy-message=no
%ins-blist-addr-to-header=yes
```

```
From: "mail45" <mail45@rh.et.ma.co.jp>
To: "ha01" <ha01@rh.et.ma.co.jp>
Subject: %set-email-settings#1234%
Date: Tue, 13 Nov 2001 23:53:40 +0900
MIME-Version: 1.0
Content-Type: text/plain;
     charset="iso-2022-jp"
Content-Transfer-Encoding: 7bit Followings are e-mail environment settings.

%receive-interval-time=5;(0 hour 0 minuites 5 second)
%accept-request-to-reply=yes
%relay-to-fax-and-print=no
%relay-to-fax-accept-domain=
%file-format=JPEG
%insert-text=yes
%insert-text-language=eng
%receipt-notification=
%ignore-mdn-request=no
%request-mdn-accept-domain=
%reply-mdn-copy-message=no
%ins-blist-addr-to-header=yes
```

FIG.12

```
Return-Path; <ha01@rh.et.ma.co.jp>
Received: from ha01 ([192.168.1.66])
          by radh.rh.et.ma.co.jp (8.9.3/8.8.7)with SMTP id AAA18322
          for <mail45@rh.et.ma.co.jp>; Wed, 14 Nov 2001 00:00:17 GMT
Message-Id: <200111140000.AAA18322@radh.rh.et.ma.co.jp>
From: "ha01(abcd01)" <ha01@rh.et.ma.co.jp>
Date: Tue, 13 Nov 2001 23:55:00 +0900
To: mail45@rh.et.ma.co.jp
Subject; Re: %set-email-settings#1234%
In-Reply-To:
References:
MIME-Version:1.0
Content-Type; text/plain; charset="us-ascii"
Content-Transfer-Encoding: 7bit
X-UIDL: X$M!!T#P!!-RX"!*IX"!

Editing the e-mail parameter was performed.

Followings are the current settings.

%receive-interval-time=5;(0 hour 0 minuites 5 second)
%accept-request-to-reply=yes
%relay-to-fax-and-print=no
%relay-to-fax-accept-domain=
%file-format=JPEG
%insert-text=yes
%insert-text-language=eng
%receipt-notification=
%ignore-mdn-request=no
%request-mdn-accept-domain=
%reply-mdn-copy-message=no
%ins-blist-addr-to-header=yes Followings were the previous settings.

%receive-interval-time=2;(0 hour 0 minuites 2 second)
%accept-request-to-reply=yes
%relay-to-fax-and-print=no
%relay-to-fax-accept-domain=
%file-format=PDF
%insert-text=yes
%insert-text-language=eng
%receipt-notification=mdn
%ignore-mdn-request=no
%request-mdn-accept-domain=
%reply-mdn-copy-message=no
%ins-blist-addr-to-header=yes
```

FIG.13

```
Return-Path; <ha01@rh.et.ma.co.jp>
Received: from ha01 ([192.168.1.66])
        by radh.rh.et.ma.co.jp (8.9.3/8.8.7)with SMTP id AAA18322
        for <mail45@rh.et.ma.co.jp>; Wed, 14 Nov 2001 00:00:17 GMT
Message-Id: <200111140000.AAA18322@radh.rh.et.ma.co.jp>
From: "ha01(abcd01)" <ha01@rh.et.ma.co.jp>
Date: Tue, 13 Nov 2001 23:55:00 +0900
To: mail45@rh.et.ma.co.jp
Subject; Re: %set-email-settings#1234%
In-Reply-To:
References:
MIME-Version:1.0
Content-Type; text/plain; charset="us-ascii"
Content-Transfer-Encoding: 7bit
X-UIDL: X$M!!T#P!!-RX"!*IX"!

Editing the email parameter was failed.

The request marked ">>" is invalid.

%receive-interval-time=5;(0 hour 0 minuites 5 second)
   %accept-request-to-reply=yes
   %relay-to-fax-and-print=no
   %relay-to-fax-accept-domain=
>>%file-format=JPEG
   %insert-text=yes
   %insert-text-language=eng
>>%receipt-notification=
   %ignore-mdn-request=no
   %request-mdn-accept-domain=
   %reply-mdn-copy-message=no
   %ins-blist-addr-to-header=yes Followings are the current settings.

%receive-interval-time=5;(0 hour 0 minuites 5 second)
%accept-request-to-reply=yes
%relay-to-fax-and-print=no
%relay-to-fax-accept-domain=
%file-format=PDF
%insert-text=yes
%insert-text-language=eng
%receipt-notification=mdn
%ignore-mdn-request=no
%request-mdn-accept-domain=
%reply-mdn-copy-message=no
%ins-blist-addr-to-header=yes
```

FIG.14 failed

%receive-interval-time=5;(0 hour 0 minuites 5 second)
%accept-request-to-relay=yes
%relay-to-fax-and-print=no
%relay-to-fax-accept-domain=
%file-format=JPEG
%insert-text=yes
%insert-text-language=eng
%receipt-notification=
%ignore-mdn-request=no
%request-mdn-accept-domain=
%reply-mdn-copy-message=no
%ins-blist-addr-to-header=yes

FIG.15

```
Return-Path: <ha02@rh.et.ma.co.jp>
Received: from ha02 ([192.168.1.66])
    by radh.rh.et.ma.co.jp (8.9.3/8.8.7) with SMTP id XAA18299
    for <mail45@rh.et.ma.co.jp>: Tue. 13 Nov 2001 23:59:47 GMT
Message-Id: <200111135359.XAAA18299@radh.rh.et.ma.co.jp>
From: ha02@rh.et.ma.co.jp
Date: Tue. 13 Nov 2001 23:46:51 +0900
To: mail45@rh.et.ma.co.jp
Subject: Re: %get-onetouch#1234%
In-Reply-To:
References:
MIME-Version: 1.0
Content-Type: text/plain: charset="us-ascii"
Content-Transfer-Encoding: 7bit
X-UIDL: 5nU!!/Uk"!6[K"!CZC!!

Followings are the current onetouch-dial list.

@start-record
01::17-/-001:mail40@rh.et.ma.co.jp:1,2,3:33,64:TIFF-S:
02:mail141(Q2 TIFF):17-/-002:mail41@rh.et.ma.co.jp:1,2:37,50:TIFF-F:
03:mail42(Q3 PDF):17-/-003:mail42@rh.et.ma.co.jp:1,2,3,4,5,6,7,8,9,10,11::PDF:
04:::::::
@end-record
```

FIG.16

```
Return-Path: <h15@rh.et.ma.co.jp>
Received: from h15 ([192.168.1.66])
    by radh.rh.et.ma.co.jp (8.9.3/8.8.7) with SMTP id WAA23793
    for <admin@rh.et.ma.co.jp>: Wed, 14 Nov 2001 22:58:10 GMT
Message-Id: <200111142258.WAA23793@radh.rh.et.ma.co.jp>
From: h15@rh.et.ma.co.jp
Date: Wed, 11 Apr 2001 20:05:23 +0900
To: admin@rh.et.ma.co.jp
Subject: Re: %get-fax-rx-log#111%
In-Reply-To:
References:
MIME-Version: 1.0
Content-Type: text/plain: charset="us-ascii"
Content-Transfer-Encoding: 7bit
X-UIDL: =gg!!de"!"c7"!Ggl!!

Followings are the fax receptio log.

Note:Use the fixed width Font for reading this message.

001 :          :NORMAL :11/14 10:53 :0' 39": 0  :   :R.1.1:Manual
002 :TT11-01   :FINE   :11/14 10:57 :0' 20": 1  :   :# 0 K :Manual
003 :24        :NORMAL :11/14 12:41 :0' 22": 2  :   :# 0 K :Polling
004 :242424    :NORMAL :11/14 13:15 :0' 10": 0  :   :#R.1.2:
005 :242424    :NORMAL :11/14 13:16 :0' 10": 0  :   :#R.1.2:
006 :TT11-01   :NORMAL :11/14 13:17 :0' 11": 1  :   :# 0 K :
007 :242424    :NORMAL :11/14 13:18 :0' 10": 0  :   :#R.1.2:
008 :TT11-01   :NORMAL :11/14 13:21 :0' 12": 1  :   :# 0 K :
001 :24        :NORMAL : 4/11 11:41 :0' 29": 3  :   :# 0 K :F-Poll
002 :TT11-01   :NORMAL : 4/11 11:50 :0' 15": 1  :   :# 0 K :
003 :TT11-01   :NORMAL : 4/11 11:53 :0' 15": 1  :   :# 0 K :
004 :TT11-01   :NORMAL : 4/11 12:06 :0' 19": 1  :   :# 0 K :
005 :TT11-01   :NORMAL : 4/11 12:25 :0' 20": 2  :   :# 0 K :
006 :TT11-01   :NORMAL : 4/11 12:27 :0' 20": 2  :   :# 0 K :
007 :TT11-01   :NORMAL : 4/11 12:29 :0' 20": 2  :   :# 0 K :
008 :TT11-01   :NORMAL : 4/11 12:30 :0' 20": 2  :   :# 0 K :
009 :          :NORMAL : 4/11 19:34 :0' 10": 0  :   :#R.1.2:
010 :          :S-FINE : 4/11 19:37 :0' 48": 0  :   :#R.4.4:
011 :          :S-FINE : 4/11 19:41 :1' 11": 0  :   :#R.4.4:F-Relay
```

INTERNET FACSIMILE APPARATUS AND THE APPARATUS SETTING METHOD

BACKGROUND OF THE INVENTION

1. Field of the Invention

The present invention relates to an Internet facsimile apparatus and an apparatus setting method.

2. Description of the Related Art

An Internet facsimile apparatus, which has a printing function, is capable of transmitting and receiving facsimile data by attaching an e-mail, and also communicates with other G3 facsimile devices. It would be convenient for apparatus settings (such as environment and one-touch dial settings) to be controlled in remote service centers by using e-mail and the setting condition can also be referred or updated by users. However, when the settings can be referred or updated by remote control using e-mail, unauthorized third parties can check or change the settings.

Moreover, a sender of an e-mail cannot immediately verify referred or updated settings.

Furthermore, the Internet facsimile apparatus is not user friendly, as updated data must be described in a predetermined format every time it is updated.

Accordingly, a first advantage of the present invention is that the Internet facsimile apparatus accepts apparatus setting commands only from authorized senders.

A second advantage of the present invention is that the Internet facsimile apparatus authenticates a sender of an e-mail.

A third advantage of the present invention is that a sender of an e-mail including a command for updating apparatus settings (update e-mail) can immediately know the result of updating apparatus settings.

A fourth advantage of the present invention is that, when e-mail is returned from the Internet facsimile apparatus for notifying a result of updating apparatus settings (return e-mail), updated items are shown so as to be easily recognized.

A fifth advantage of the present invention is that, in the Internet facsimile apparatus, a sender of update e-mail can immediately know items that could not be updated.

A sixth advantage of the present invention is that, in the Internet facsimile apparatus, updated information is shown more clearly for the convenience of update e-mail senders.

A seventh advantage of the present invention is that the Internet facsimile apparatus can save labor because setting data can be described easily when updating apparatus settings.

SUMMARY OF THE INVENTION

The present invention relates to an Internet facsimile apparatus that is capable of transmitting and receiving facsimile messages by e-mail. The Internet facsimile apparatus includes a means that accepts remote commands sent by e-mail, a means that permits or rejects remote commands based on a domain name or the e-mail address of the sender, and a means that executes remote commands if it is permitted.

It is preferable that remote commands are provided for referring or updating apparatus settings.

It is also preferable that remote commands are accepted or rejected based on a domain name and password or an e-mail address and password.

The Internet facsimile apparatus of the present invention is convenient as apparatus setting commands can be entered by e-mail even if users are away from the apparatus. Moreover, the Internet facsimile apparatus can prevent unauthorized refer by third parties as apparatus setting commands are checked based on the domain name or the e-mail address of the sender. Furthermore, when the domain name and the e-mail address easily acquired from the e-mail header is stored in advance, in a table, the Internet facsimile apparatus can authenticate a sender of the e-mail readily.

Additionally, as apparatus setting commands are provided for referring to and updating apparatus settings, unauthorized third parties cannot refer the apparatus setting data and only authorized persons can update setting data.

Besides, unauthorized third parties cannot refer setting data, as setting commands are checked twice based on a domain name and password, or an e-mail address and password.

The present invention relates to the Internet facsimile apparatus, which includes a mean that accepts remote commands for updating apparatus settings (update commands) by e-mail, a means that updates apparatus settings based on a update command, and a means that returns updated setting data to a sender of update commands.

It is preferable that setting data before being updated is also returned with the updated setting data.

It is more preferable that items that could not be updated be shown with emphasis.

Furthermore, it is preferable that updated setting data is returned in a plurality of formats.

In the Internet facsimile apparatus of the present invention, it is convenient that apparatus setting commands can be entered by e-mail even if senders of the e-mail are away from the apparatus and the result is returned to senders immediately. The Internet facsimile apparatus is convenient as e-mail senders can check setting data both before and after updating when updating apparatus settings.

Moreover, the Internet facsimile apparatus is more convenient for senders as items that could not be updated are underlined or shown in red letters in order to let senders know command failure immediately.

Furthermore, the Internet facsimile apparatus is convenient as a result of updating apparatus settings is returned to e-mail senders in a plurality of formats. For example, text format is used in a main text of return e-mail, and HTML format is used in a file attached to the return e-mail, when describing a result of updating apparatus settings. HTML format is suitable for showing letters with emphasis and changing a font. Text format is suitable for managing a result of apparatus settings in computers. When HTML format is not supported by a computer used by a sender, return e-mail is presented in text format.

The present invention relates to the Internet facsimile apparatus that is capable of transmitting and receiving facsimile messages using e-mail. The Internet facsimile apparatus includes a means that accepts remote commands referring to apparatus settings (reference command) by e-mail, a means that refers present setting data in a predetermined format based on the reference command, a means that accepts remote commands for updating apparatus settings (update command) in a predetermined format by e-mail, and a means that sets up own apparatus based on update commands.

The Internet facsimile apparatus of the present invention can save labor, as updated e-mails can be easily created by overwriting received e-mails and using the same format as the one used in referring to the apparatus settings. Thus, apparatus settings can be updated immediately.

BRIEF DESCRIPTION OF THE DRAWINGS

FIG. 3 is a table, in which domain names authorized to update and refer to apparatus settings are registered, in the preferred embodiment.

FIG. 4 is a table, in which e-mail addresses authorized to update and refer to apparatus settings are registered, in the preferred embodiment.

FIG. 5 is a table, in which combinations of e-mail address and password authorized to update apparatus settings are registered, in the preferred embodiment.

FIG. 6 is a table, in which combinations of domain name and password authorized to update and refer to apparatus settings are registered in every item, in the preferred embodiment.

FIG. 8 is an example of e-mail including a command for the reference of apparatus settings (reference e-mail).

FIG. 9 is an example of e-mail that is created after referring to apparatus settings (return e-mail).

FIG. 10 is an example of computer display, on which a result of referring to apparatus settings is overwritten as update data.

FIG. 11 is an example of e-mail for updating apparatus settings.

FIG. 12 is an example of return e-mail, which notifies that apparatus settings are updated properly.

FIG. 13 is an example of return e-mail, which notifies that apparatus settings could not be updated.

FIG. 14 is an example that items that could not be updated are marked up.

FIG. 15 is an example of return e-mail created after referring to a setting of one-touch dial.

FIG. 16 is an example of return e-mail created after referring to log files of received facsimile.

DETAILED DESCRIPTION OF THE INVENTION

Figure 1:
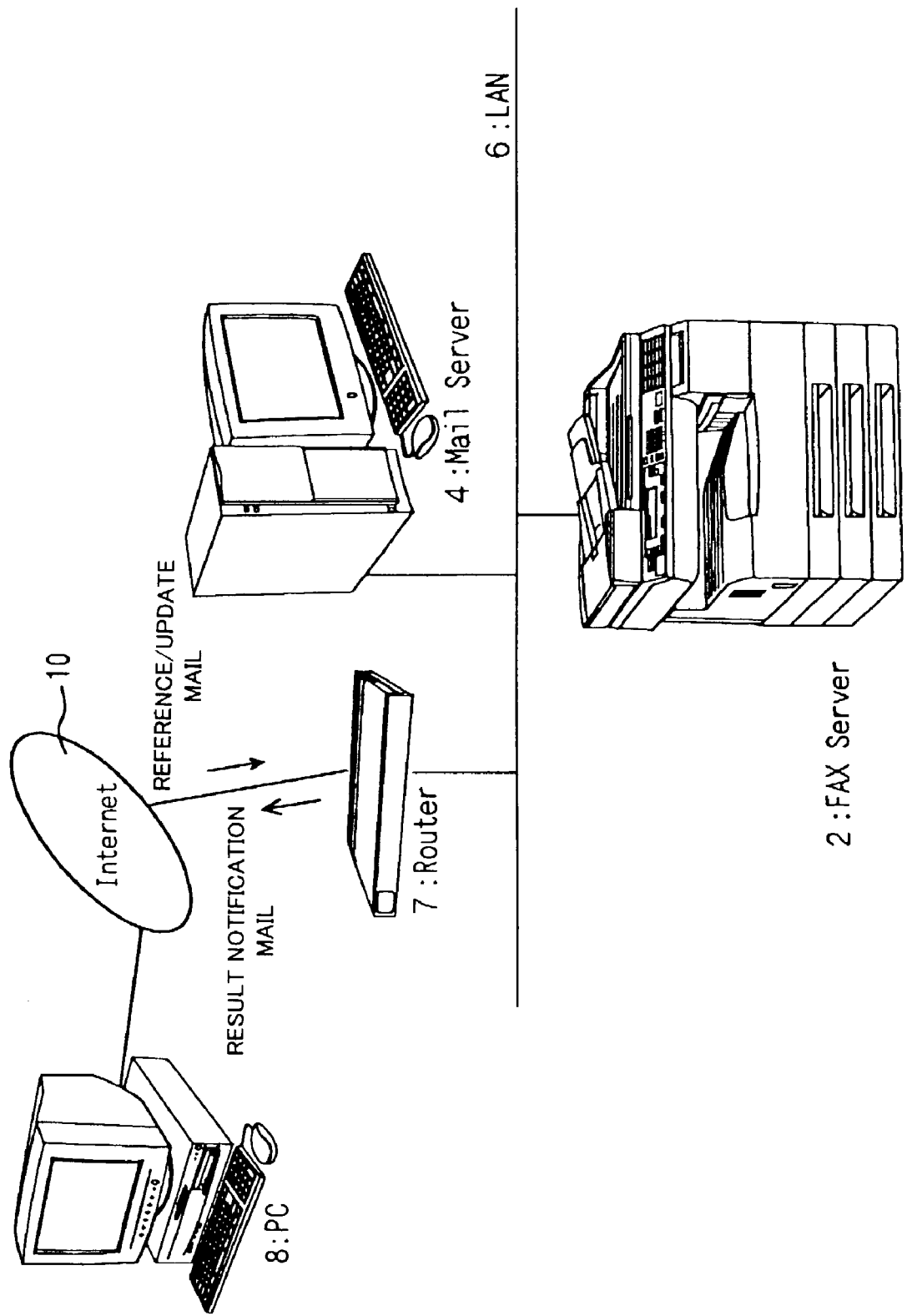
FIG. 1 is a diagram showing a connection among a facsimile server, a mail server, and a personal computer in a preferred embodiment.

A preferred embodiment of the present invention will be described with reference to FIG. 1~FIG. 16. FIG. 1 shows an example of an Internet facsimile server, in which the facsimile server 2 is connected to an e-mail server 4, a router 7, and a personal computer (not shown in the drawings) through a LAN 6. Internet 10 and the LAN 6 are connected through the router 7. A personal computer 8, connected to the e-mail server 4 or the facsimile server 2 via the Internet 10, can be changed to another communication terminal. In the preferred embodiment of the present invention, the personal computer 8 is assumed as a service center or a personal computer managing LAN. The facsimile server 2, which transmits and receives facsimile data via the Internet using e-mail, is connected to G3 facsimile apparatus via PSTN (not shown in the drawings).

The arrows in FIG. 1 show paths of transmitting or returning reference or update e-mail between the facsimile server 2 and the personal computer 8 via the Internet 10.

Figure 2:
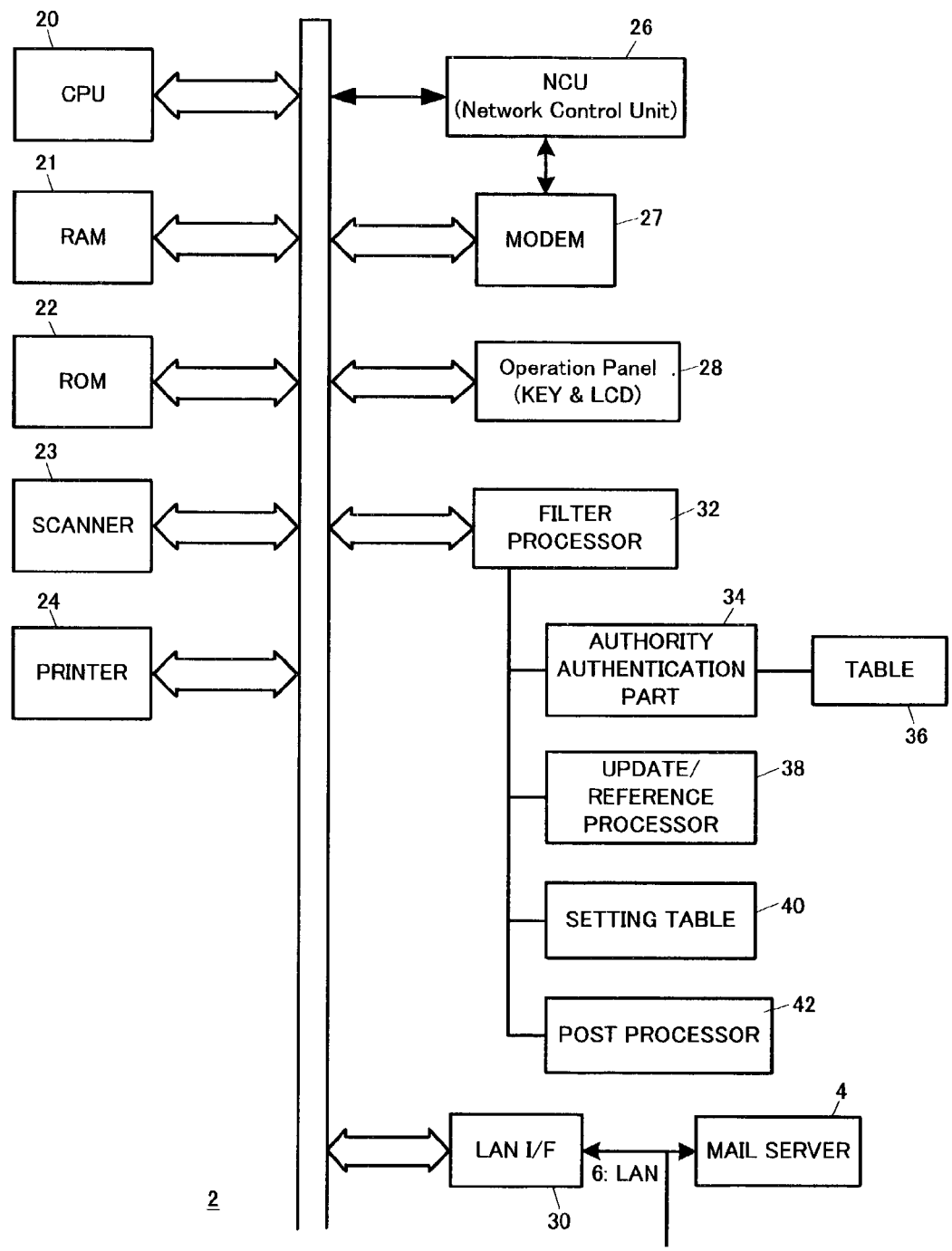
FIG. 2 is a block diagram showing a configuration of the facsimile server in the preferred embodiment.

As shown in FIG. 2, the facsimile server 2 includes CPU 20, RAM 21 for storing data in progress and facsimile data, ROM 22 for storing programs, a scanner 23 for inputting images, a printer 24 for printing on paper, etc., NCU 26, MODEM 27, an operation/display part 28 having a key board or LCD, and LAN Interface (LAN I/F) 30 for connecting to the LAN 6.

The LAN I/F 30 is used for setting up apparatus in the remote personal computer 8, and transmitting and receiving facsimile data via the Internet or communication in the LAN 6, for example by e-mail. An e-mail includes a header describing destination and sender information, a main text, and an attachment file describing facsimile data.

A filter processor 32, which authenticates e-mail senders that require apparatus settings and eliminating unauthorized refer by third parties, executes commands (reference or update) described in a subject field of the e-mail from a sender that has authority over apparatus settings. An authority authentication part 34 is provided for checking whether or not a domain name or e-mail address of the sender described in the e-mail header is registered in a table 36 in advance. It is preferable that the authority authentication part 34 also checks the password as well as the domain name or e-mail address. In this case, not only is the domain name or the e-mail address is registered in table 36 but the password is also registered. The authority authentication part 34 then authenticates apparatus setting commands from a sender, and permits to execute commands of referring and/or updating apparatus settings within a limit if there is an authority.

An update/reference processor 38 refers or updates apparatus settings based on apparatus setting commands from authorized senders. For example, the update/reference processor 38 updates settings of e-mail programs or one-touch dialing based on an command, and returns an e-mail after referring apparatus setting data based on a reference command. Moreover, apparatus setting commands are described in the subject field of an e-mail, and the filter processor 32 determines whether or not an incoming e-mail is related to apparatus settings by checking the subject field. A setup table 40 stores a constant number indicating a setting parameter or setting data such as one-touch dialing, and the table 36 and the setting table 21 may be created in a part of the RAM 40 and the ROM 22.

A post processor 42 returns a result of referring or updating apparatus settings by e-mail or prints it out. When apparatus settings are updated properly, the completion and the setting data before and after updating are respectively reported as notifications of updating. Moreover, updated setting data (present data) or only updated items can be returned. If data is not updated properly, items that could not be updated can be marked so as to be easily recognized by users, or present setting data can be returned with data before updating.

FIG. 3~FIG. 6 show examples of tables for authenticating. FIG. 3 is a table in which domain names authorized to refer or update apparatus settings are registered, and FIG. 4 is a table in which e-mail addresses authorized to refer or update apparatus settings are registered. FIG. 5 is a table in which both e-mail addresses and passwords authorized to update apparatus settings are registered, in case that authorities to refer and update apparatus settings are considered separately. FIG. 6 is a table, in which domain names and passwords authorized to refer or update apparatus settings are registered in every item of apparatus settings.

The table for authenticating will be described more in detail. A domain name and e-mail address of a sender can be acquired from the "From" field in an e-mail header. As the domain name "rh.et.ma.co.jp" is registered in the table of FIG. 3, a sender having the domain name is permitted to refer or update apparatus settings. As the e-mail address "mail45@rh.et.ma.co.jp" is registered in the table of FIG. 4, the sender having the e-mail address is permitted to refer or update apparatus settings.

As a combination of the e-mail address "mail45@rh.et.ma.co.jp" and the password "1234%" is registered in the table of FIG. 5, the sender having this e-mail address and this password is permitted to update apparatus settings. Additionally, passwords are described in the "subject" field, and a command and password associated with apparatus settings are described together. A password may also be described in a field other than the "subject" field.

FIG. 6 shows an example of a table for authenticating. Domain names and passwords authorized to refer or update apparatus settings are registered in every item of apparatus settings in the table of FIG. 6. Herein, e-mail addresses may be registered instead of domain names. For example, a domain name authorized to update and refer apparatus settings is registered with a password in the first item (receive-internal-time), and a domain name authorized to only refer apparatus settings and a combination of a domain name and a password authorized to both update and refer apparatus settings are registered in the item "file-format". A domain name or e-mail address must be accorded with a password for authentication when updating, however only a domain name or an e-mail address may be authenticated when referring apparatus settings. Moreover, a plurality of passwords can be used in the same domain name, and passwords can be changed based on the level of importance of reference and update items.

Additionally, a domain name and an e-mail address of a sender can be acquired from the "From" field in the e-mail header, and the password can be acquired from the "subject" field. If an incoming e-mail has a combination of the domain name "po.net.or.jp" and the password "9876%" and the combination is registered in the table shown in FIG. 3, the e-mail sender is permitted to update and refer the receive-internal-time.

Figure 7:
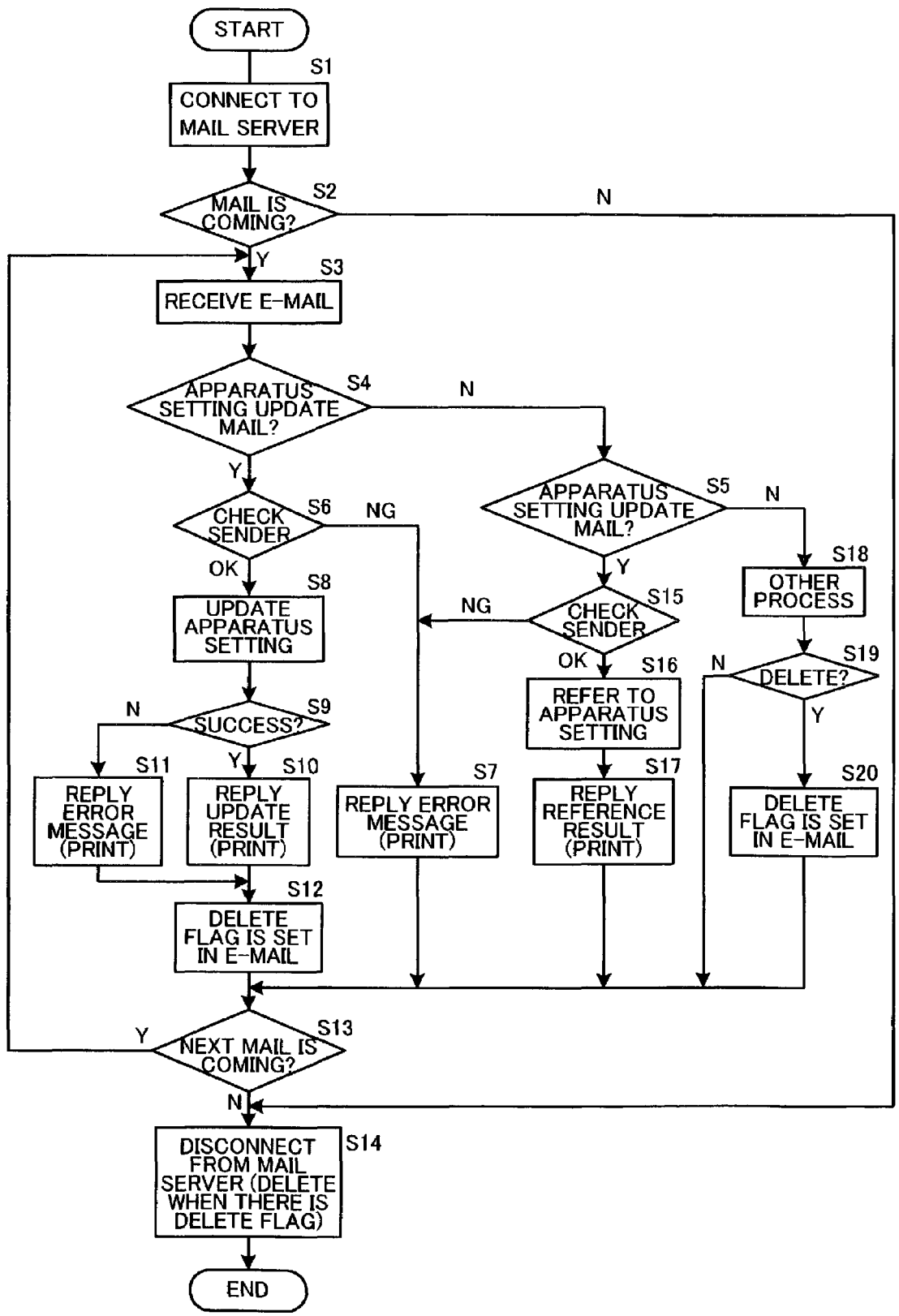
FIG. 7 is a flow chart showing an algorithm for authenticating received e-mail and updating or referring to apparatus settings, in the preferred embodiment.

The operation of the filter processor 32 will be described with reference to the flow chart of FIG. 7. When the facsimile server 2 is connected to the e-mail server 4 (Step 1) and receives e-mail (Steps 2, 3), the presence of an apparatus setting command(s) in the "subject" field of an e-mail is checked, and the e-mail is determined to the e-mail for updating or referring the apparatus setup, or the other e-mail (Steps 4, 5). In case of update e-mail, whether or not an e-mail sender is authorized to update apparatus settings is checked based on the tables as described above, the domain name and the e-mail address of the sender, or a combination with a password (Step 6). If the sender is not authorized, an error message that the apparatus could not be updated is returned to the sender, and the error message is outputted (printed out) by the facsimile server 2 in the setup (Step 7).

If the sender is authorized properly, apparatus settings are updated based on a command of the update e-mail (Step 8). The update result is returned when apparatus settings are updated properly (Steps 9, 10), an error message is returned when settings could not be updated (Step 11), and the result is printed out. The output (print out) of a result by the facsimile server 2 can notify users of the Internet facsimile apparatus the fact that apparatus settings are made by remote control, however this process can be eliminated. Next, a delete flag is set in a e-mail box of an e-mail server when the update e-mail is processed (Step 12), the connection to the e-mail server is broken if no e-mail is coming (Step 13), and the e-mail server deletes the update e-mail (Step 14). Additionally, the delete flag is provided for not executing the update again, and the update e-mail is forced to be deleted after processing, even in the case that the other received e-mail of facsimile data via the Internet is not deleted from the mailbox. Moreover, the update e-mail is not recorded in a receive log as a general for preventing from being out of memory as it is the unnecessary information for users of the facsimile server.

A reference e-mail is also processed as described above. A sender of reference e-mail is authorized based on the tables as described above, the domain name or the e-mail address of the sender, or a combination with a password (Step 15). If the sender has reference authority, apparatus settings can be referred (Step 16). The setting result is then returned to the sender and also the result is output by the facsimile server 2 (Step 17). If apparatus settings could not be referred, an error message is reported to the sender and the facsimile server 2 also outputs the message (Step 7). As a reference e-mail may be referred more than once, there is no need to set up the delete flag of the e-mail. The received reference e-mail is also not recorded in the receive log. The required process is carried out when receiving facsimile message via the Internet if update or reference commands are not described in the e-mail (Step 18), and the delete flag is set in the e-mail box (Step 20) if the facsimile message received via the Internet is set to be deleted from the e-mail box (Step 19).

FIG. 8 shows an example of a reference e-mail, and FIG. 9 shows an example of return e-mail notifying a reference result. FIG. 11 shows an example of an update e-mail, and FIG. 12 shows an example of a return e-mail when apparatus settings are updated properly. FIG. 13 and FIG. 14 show examples of return e-mails when apparatus settings could not be updated properly. FIGS. 8~14 show examples of e-mails when the sender "mail 45" referred or updates settings of the facsimile server "ha01".

As shown in FIG. 8, the description "% get-email-settings" in the "Subject" field shows a command for referring apparatus settings concerning an e-mail, and the following "1234%" shows a password of a sender. An e-mail address and domain name of the sender are described in the "From" field. Present apparatus setting conditions (setting data) are described as reference results in a main text of the return e-mail of FIG. 9.

The personal computer 8 receives an e-mail including a reference result, and the contents of a reference result are shown on a display 50 as illustrated in FIG. 10. The result is used for making an update e-mail. The update e-mail created as illustrated in FIG. 11 is transmitted, and the e-mail settings of facsimile servers are updated (apparatus settings concerning e-mail are updated). In the description "% set-email-settings#" in the "Subject" field of the update e-mail, "set" is a command for updating apparatus settings (update command) and "email-settings" is a command showing that the object of update command is e-mail environment settings. The sender changes the "Subject" field in the update e-mail from "get" to "set" for notifying the reference result, as illustrated in FIG. 9. The first item (receive-interval-time) is then overwritten to 5 minutes, the file format to JPEG, and the reception message to be blank. After that, it is retransmitted to the facsimile server. More specifically, a format of return e-mail after referring to apparatus settings is the same as the one of the update e-mail, so that senders need only to change apparatus setting data in the received reference e-mail and to transmit it as the update e-mail. The example of a return e-mail to an update e-mail is shown in FIG. 12 or FIG. 13.

FIG. 12 shows an e-mail notifying update result when apparatus settings are updated properly. In FIG. 12, the fact that settings are updated properly is shown in the header part, and present setting data and setting data before updating are shown in a text format in a main text of the e-mail. As the setting data before updating is described in the latter part of the main text, the sender can confirm that the first item (receive-interval-time) is updated. The example of FIG. 12 also shows setting data that could not be updated, however only the updated items can be shown. Moreover, updated items can be underlined so as to be recognized immediately. Instead of, or in addition to notifying an update result in the text format, an HTML file in an alternative form can be used for notifying, in which updated items are marked up by changing the color of the items to red and underlining. Additionally, when apparatus settings are fully updated, the sender can choose whether or not update data is included in the return e-mail.

FIG. 13 shows an example of an e-mail notifying an update result when apparatus settings could not be updated properly. The description "Editing the e-mail parameter was failed." in a main text of FIG. 13 shows that some item could not be updated, and the other part shows the transmitted update data (setting data to be updated). The mark "<<" is added to the items that could not be updated, however it can be underlined. In this case, the file format could not be updated to JPEG, and the receipt notification could not be blank. FIG. 14 shows an example that the items that could not be updated are marked up (it is underlined in the preferred embodiment) so as to be recognized immediately. Markup is used in the HTML format, and the color of markup parts can be changed to red. As a present setting condition is described in a following part of the title "Following are the current settings." in the latter part of a main text of FIG. 13, it is used for making the next update e-mail. Moreover, an update result can be confirmed automatically as well as the transmission of update e-mail.

FIG. 10~FIG. 14 show examples of return e-mail. An update result can also be shown in a return e-mail in the text format, and the HTML file in the alternative format as in FIG. 14 can also be attached to the return e-mail. As the text and HTML formats are both used in the return e-mail, the receiver of return e-mail can output a main text of the text file even with the personal computer in which HTML format is not supported.

FIG. 15 shows an example of return e-mail to a reference e-mail of one-touch dialing (command "one touch" specifies the object of the reference). FIG. 16 shows an example of return e-mail to the reference e-mail of a log file in the received facsimile message (command "fax-rx-log" specifies the object of the reference). It is convenient as apparatus settings can be referred or updated with every item such as e-mail environment, one-touch dialing, or reception log.

According to the preferred embodiment, the facsimile server includes the filter processor, which authenticates a sender of an e-mail concerning apparatus settings and permits only senders registered in advance to update and refer apparatus settings. A domain name and e-mail address acquired from an e-mail header or a combination with a password is used for authenticating senders, so that the authority of senders can be easily checked and unauthorized refer by third parties can be prevented.

Moreover, according to the preferred embodiment, the sender of an e-mail including an update command can obtain updated items and a present setting condition immediately as well as the update result. When the updated items and the items that could not be updated are marked up, the update content is recognized at a glance, and the result can be acquired easily.

Furthermore, according to the preferred embodiment, the sender of an e-mail including an update command can only transmit an update e-mail that is made by changing setting data using a format of return e-mail notifying a reference result. The sender can easily describe update data, which can save labor. In addition, apparatus settings can be updated readily.

What is claimed is:

1. An Internet facsimile apparatus transmitting and receiving facsimile messages by e-mail, comprising:
    means for accepting remote update commands for updating apparatus settings in a predetermined e-mail format by e-mail;
    means for accepting apparatus settings based on the remote update commands; and,
    means for returning updated setting data in the predetermined e-mail format,
    wherein setting data before updating is also returned with the updated setting data, and
    wherein the setting data not updated is shown with emphasis in the updated setting data.

2. The Internet facsimile apparatus as in claim 1, wherein the updated setting data is returned in a plurality of formats.

3. A method for setting parameters for an Internet facsimile apparatus comprising:
    accepting remote update commands in a predetermined e-mail format sent by e-mail;
    updating apparatus settings based on the remote update commands;
    returning updated setting data in the predetermined e-mail format;
    returning setting data before updating with the undated setting data; and
    indicating the setting data not updated with emphasis.

4. The method as in claim 3, further comprising returning the updated setting data in a plurality of formats.

5. An Internet facsimile apparatus comprising:
    means for accepting remote update commands in a predetermined e-mail format by e-mail;
    means for permitting or rejecting execution of the remote update commands based on a domain name or an e-mail address of the sent e-mail;
    means for updating settings based on the remote update commands when the execution of the remote update commands is permitted; and
    means for returning updated setting data in response to the remote update commands in the predetermined e-mail format,
    wherein setting data before updating is also returned with the updated setting data, and
    wherein setting data not undated is shown with emphasis in the undated setting data.

6. The Internet facsimile apparatus as in claim 5, wherein the execution of the remote commands is permitted or rejected based on the domain name or the e-mail address, and a password.

7. The Internet facsimile apparatus as in claim 5, wherein the updated setting data is returned in a plurality of formats.

8. An Internet facsimile apparatus comprising:
    means for accepting remote reference commands by e-mail;
    means for returning present setting data in a predetermined e-mail format based on the remote reference commands;

means for accepting remote update commands by e-mail in the predetermined e-mail format;

means for setting up based on the remote update commands; and means for returning updated setting data, wherein setting data before updating is also returned with the updated setting data, and wherein setting data not undated are shown with emphasis in the undated setting data.

9. The Internet facsimile apparatus as in claim 8, wherein updated setting data is returned in a plurality of formats.

10. The Internet facsimile apparatus as in claim 8, further comprising means for permitting or rejecting the execution of the remote update commands based on a domain name or an e-mail address associated with the update command.

11. The Internet facsimile apparatus as in claim 10, wherein the execution of the remote update commands is permitted or rejected based on the domain name or the e-mail address, and a password.

* * * * *